Figure 5:
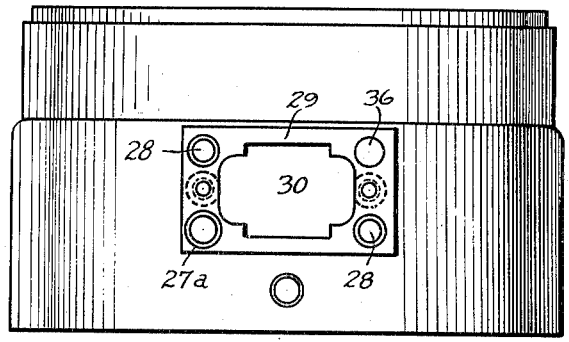

March 18, 1941.   A. F. BERGER   2,235,793
LUBRICATING APPARATUS
Filed Sept. 21, 1938   5 Sheets-Sheet 1
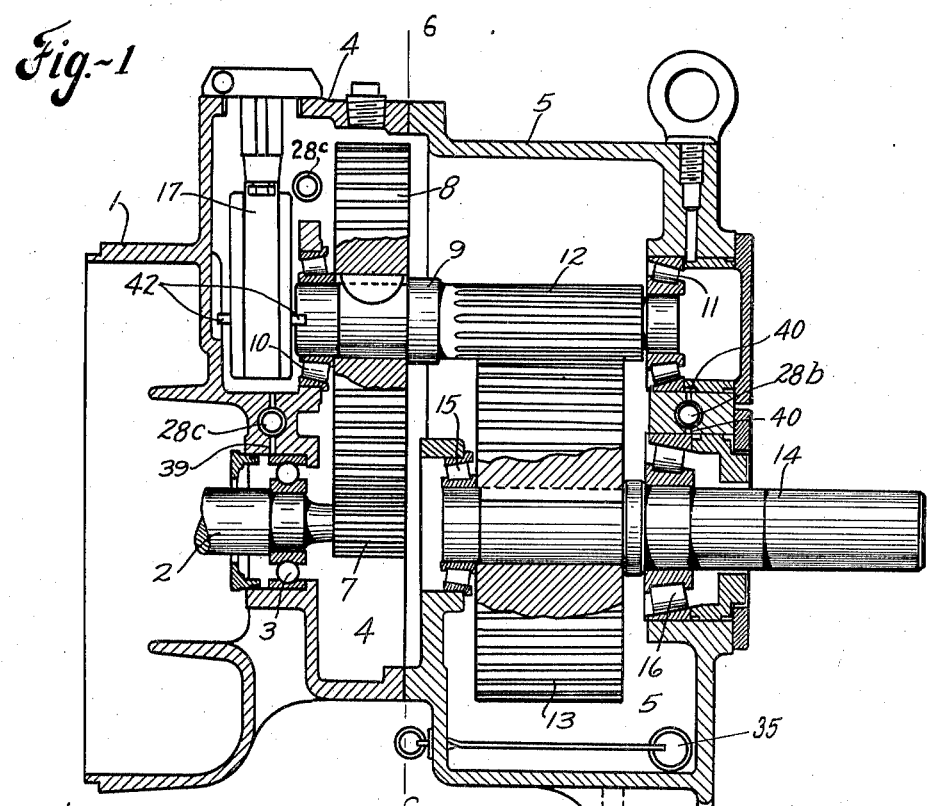
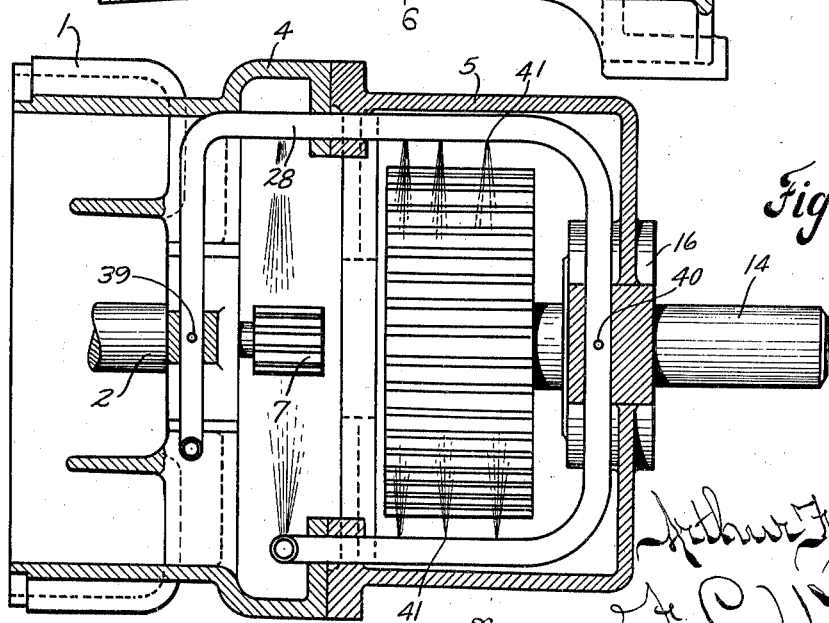

March 18, 1941.   A. F. BERGER   2,235,793
LUBRICATING APPARATUS
Filed Sept. 21, 1938   5 Sheets-Sheet 2

March 18, 1941.   A. F. BERGER   2,235,793
LUBRICATING APPARATUS
Filed Sept. 21, 1938   5 Sheets-Sheet 3
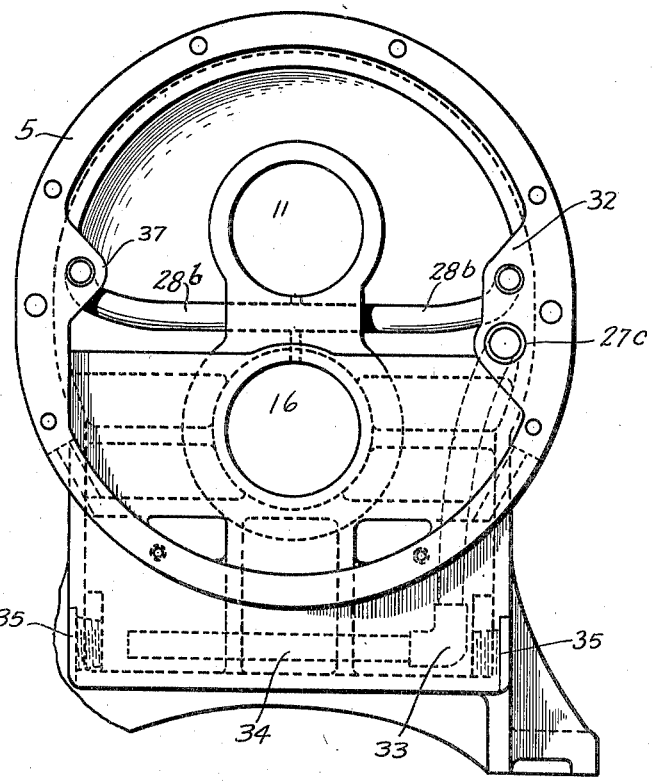
Fig.-3
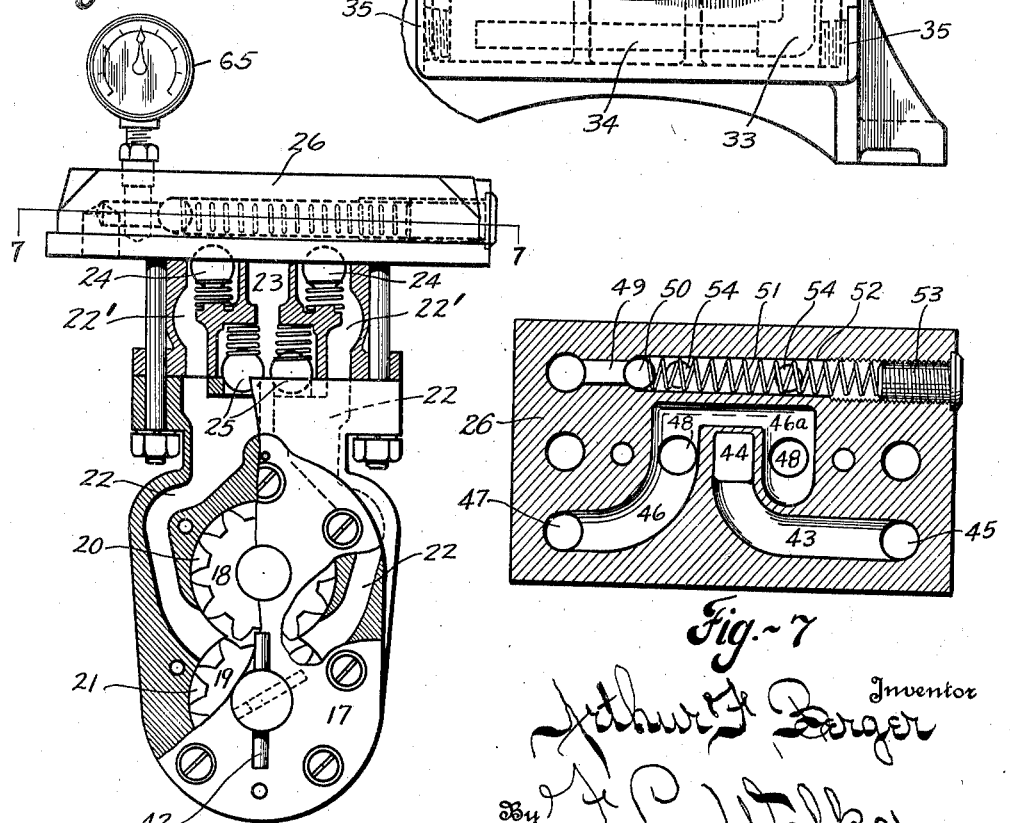
Fig.-6
Fig.-7
Inventor
Arthur F. Berger
By F. L. Walker
Attorney March 18, 1941. A. F. BERGER 2,235,793
LUBRICATING APPARATUS
Filed Sept. 21, 1938 5 Sheets-Sheet 4
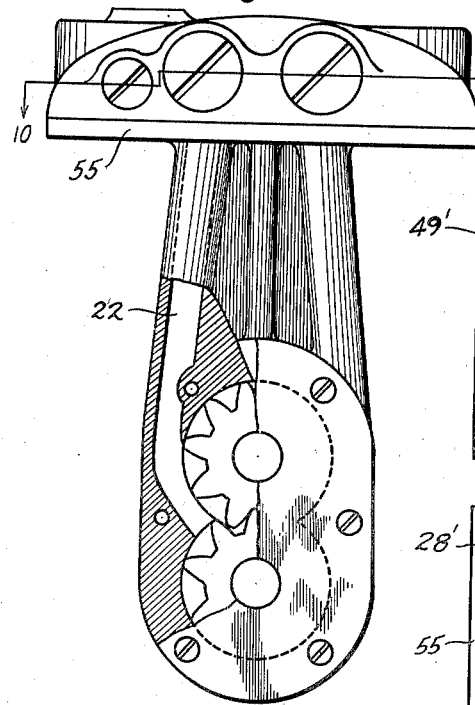
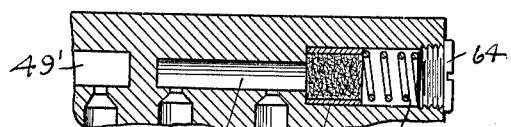
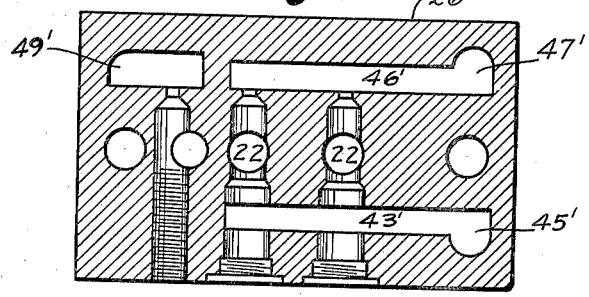
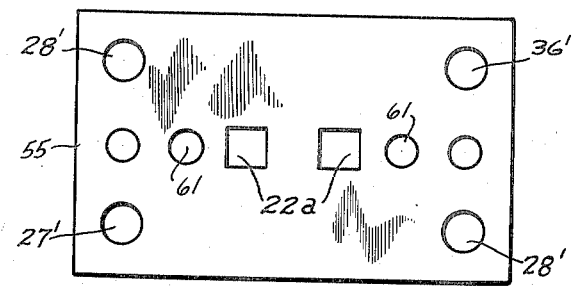
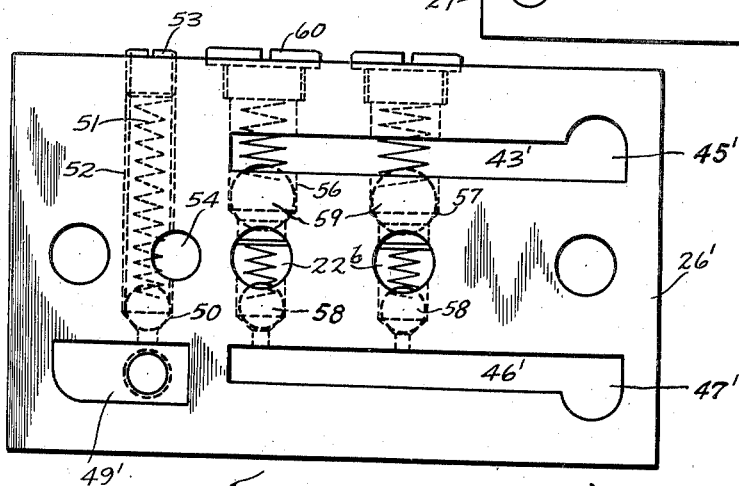

March 18, 1941. A. F. BERGER 2,235,793
LUBRICATING APPARATUS
Filed Sept. 21, 1938 5 Sheets-Sheet 5

Patented Mar. 18, 1941

2,235,793

UNITED STATES PATENT OFFICE 2,235,793

LUBRICATING APPARATUS

Arthur F. Berger, Dayton, Ohio, assignor to The Master Electric Company, Dayton, Ohio, a corporation of Ohio Application September 21, 1938, Serial No. 231,013

15 Claims. (Cl. 184—6)

This invention pertains to force feed lubrication and more particularly to a circuitous oil distribution system for repetitiously supplying oil under pressure to various bearings, gears and other operating parts of a mechanical assembly.

While the oil circulatory system forming the subject matter hereof is illustrated in its relation to a speed reduction gear transmission mechanism of an electric motor for which it is well adapted, it is to be understood that it is equally applicable to machines and assemblies of mechanical elements of different character and for various purposes other than that herein disclosed and hence the invention is not limited to the particular embodiment herein shown.

The present lubrication system is especially advantageous for those mechanisms which are subject to various changes of position, and operable temporarily or permanently in tilted relation or in partially or completely inverted positions. It is especially well adapted for application to gear head motors which to meet various conditions of use are many times necessarily installed in abnormal positions and for airplane and automobile constructions where the lubrication system must be universally adaptable to various degrees of inclination of the mechanism.

In the preferred embodiment of the invention as illustrated a pressure pumping unit is installed directly within the mechanism housing, the lowest portion of which, whatever its position may be, comprises the oil reservoir or sump. The oil drawn from the lowest portion of the casing is directed through a circuitous system of conduits which have discharge ports communicating with various bearings and discharging jets of oil under pressure onto gears and other moving parts, from which the excess oil drains to the lowest part of the casing to be again drawn into the pump for redistribution.

The object of the invention is to improve the construction as well as the means and mode of operation of force feed oil distribution systems for mechanical assemblies, whereby they may not only be more economically manufactured and installed, but will be more efficient in use, automatic in operation, uniform in action, having relatively few operating parts and unlikely to get out of repair.

A further object of the invention is to provide a pumping unit and circulatory system embodied directly in the machine or assembly to be lubricated and forming a component part thereof.

A further object of the invention is to provide an oil distribution system which will be operable in various positions of the mechanism with which it is associated, thus enabling thorough and uniform lubrication of the moving parts whatever position the machine or assembly may assume or be installed.

A further object of the invention is to provide an improved form of reversible pump unit operable equally well in either direction of rotation.

A further object of the invention is to provide a lubrication distribution system having the herein disclosed features of advantage and meritorious characteristics.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

Figure 2:
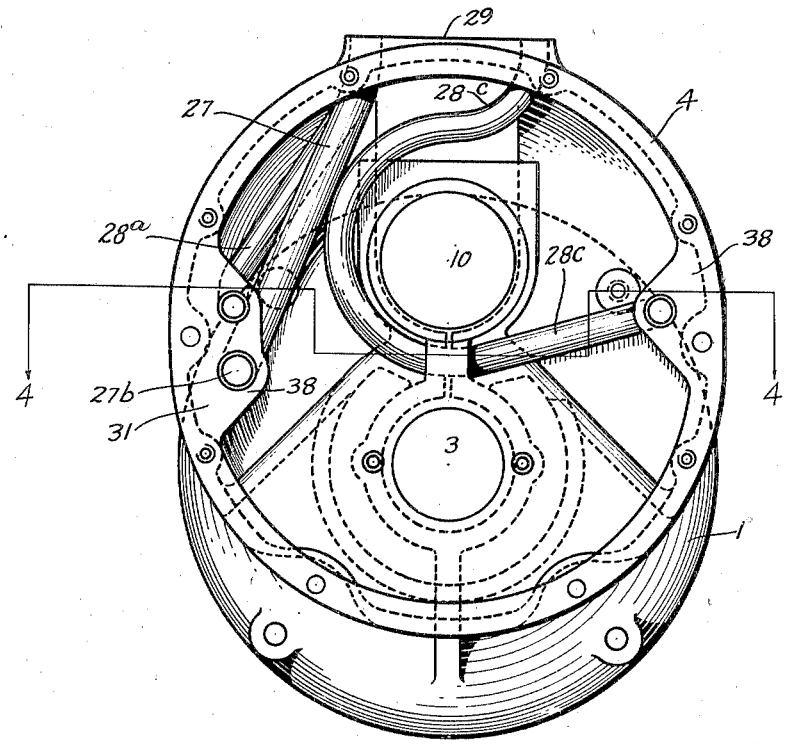

In the drawings wherein is shown a preferred but not necessarily the only form of embodiment of the invention, Fig. 1 is a vertical sectional view through the gear casing or housing of a typical gear head electric motor, in which the present invention is embodied. Fig. 2 is a front elevation of the interior of one section of the housing, to-wit: that at the left of Fig. 1, with the right-hand section removed. Fig. 3 is a front elevation of the right-hand section of the housing looking at the interior thereof. Fig. 4 is a horizontal sectional view on line 4—4 of Fig. 2 looking downwardly. Fig. 5 is a top plan view illustrating the pump mounting area. Fig. 6 is a side elevation partly in section of the rotary pump unit. Fig. 7 is a sectional plan view of the pump unit head. Fig. 8 is a side elevation of a modification of the pump unit. Fig. 9 is a top plan view of the modified pump body with the head or cap removed. Fig. 10 is a sectional plan view on line 10—10 of Fig. 8. Fig. 11 is an inverted plan view of the pump head. Fig. 12 is a detail view. Figs 13 to 18 are diagrammatic views illustrating different positions of adjustment of the pump intake connections.

Like parts are indicated by similar characters of reference throughout the several views.

While the present lubricant distribution system is applicable to a wide variety of mechanisms, for illustrative purpose but without intent to unduly limit or restrict the scope or application of the invention, there is shown in the drawings a gear transmission mechanism wherein 1 indicates the head of an electric motor or analogous mechanism of which 2 is the driving shaft mounted in bearings 3 in the head 1. The motor head 1 is an integral part of one section of a transmission housing, the respective portions 4 and 5 of which are separable as shown. At its extremity the shaft 2 carries a gear pinion 7 meshing with a large gear 8 secured upon a counter shaft 9 journaled in bearings 10 and 11 in the respective sections 4 and 5 of the housing. The counter shaft 9 is formed with integral peripheral gear teeth 12 intermeshing with a large gear 13 upon a driven shaft 14 journaled in bearings 15 and 16 both in the section 5 of the transmission housing beyond which the shaft 14 extends for delivery of power.

In the particular assembly selected for illustrative purpose lubricant must necessarily be supplied to the several bearings 3, 10, 11, 15 and 16 and also to the working faces of the several intermeshing gears. To supply oil under pressure to the various lubrication points there is suspended in the transmission housing a force pump 17 which is uniformly efficient in whatever position it may assume and is operatively coupled with the extremity of the counter shaft 9 and actuated thereby. The pump 17 may be of any suitable style or detail construction. That found most satisfactory is a rotary gear type pump wherein two intermeshing gears 18 and 19 rotatively mounted in intersecting circular chambers 20 and 21 in the pump body receive oil through either one of two passages 22 communicating with the chambers substantially coincident with their intersection, depending on their direction of rotation, and discharge the oil under pressure through the opposite of the passages 22.

Mounted above the pump body 17 is a valve housing having therein valved intake passages 22' communicating with and forming continuations of the respective passages 22 of the pump body, and an intermediate valved discharge passage 23 which communicates with both the pump body passages 22 and is common thereto. The respective inlet passages 22' are provided with inwardly opening spring actuated ball valves 24. The discharge passage 23 is provided with a pair of spring actuated outwardly opening ball valves 25 each governing the discharge from one of the pump body passages 22. Thus oil drawn past the ball valve 24 into the passage 22' at one side of the pump unit continues into the corresponding passage 22 and after passing the impeller gears 18 and 19 is discharged through the opposite passage 22 into the communicating passage 22' of valve housing. Being unable to pass the check valve 24, which is only seated the tighter by the oil pressure, the back pressure in the passage 22 opens the corresponding valve 25 and the oil under pressure escapes through the discharge passage 23. Either passage 22 and 22' may become the intake passage and the other the discharge outlet, according to the reverse directions in which the pump may be driven, but the passage 23 is always the dicharge passage and receives discharged oil from either side of the pump regardless of its direction of rotation. The pump unit is provided with a head 26 having therein multiple passages connecting the respective passages 22' and 23 of the pump unit with suction and pressure discharge conduits incorporated in the respective sections of the transmission housing.

The suction conduit 27 and pressure discharge conduit 28 are preferably preformed tubing contoured to such shapes as will enable them to reach the desired lubrication points while avoiding the operating parts. The discharge conduit 28 is so disposed as to pass in proximity to sundry bearings and working surfaces to be lubricated. The preformed conduits are preferably inserted in the molds in which the transmission housing parts are cast and the molten metal cast about various parts of the conduits so that they become permanently embedded in the housing. Continuing portions of the suction and discharge conduits are so disposed and embedded in each of the transmission housing sections with their ends in the dividing plane between the sections 4 and 5 in registry with each other so that such conduits continue uninterruptedly from one transmission housing section to the other when the housing sections are assembled.

Formed upon the exterior of the housing section 4 is a flattened mounting surface 29 for the head 26 of the pump, having therein an opening 30 through which the body of the pump is insertable in either of its rotative opposite positions. The conduits 27 and 28 open through such mounting surface 29 into communication with corresponding passages of the head 26. The initial section of the suction conduit 27 communicating with the pump head through the orifice 27a in the mounting surface 29 extends downwardly in a laterally inclined relation adjacent the inner head or wall of the housing 4 as shown in Fig. 2 and thence horizontally adjacent to the peripheral wall with its end embedded in a lug or ear 31 formed interiorly of the housing and integral with the wall thereof. The open extremity of such initial portion of the suction conduit being coincident with the plane between the sections 4 and 5 registers with the orifice 27c in a corresponding interior integral lug or ear 32 in the complementary housing portion 5 (Fig. 3). The continuing section of the suction conduit 27 extends thence substantially perpendicularly downwardly to the bottom of the housing chamber. If the apparatus is installed in either upright position as shown in the drawings or in any position of inclination toward the right of Fig. 3 within a range approaching horizontal, the terminal of such continuation of the suction conduit within the housing section 5 will extend into receiving relation with the lowest point of the housing to which the spent lubricant will drain by gravity. However, if the housing is to be inclined toward the left of Fig. 3, thereby elevating the terminal of the vertical extension of the suction conduit 27 above the lubricant drainage point, a lateral extension 34 of the conduit is provided which is detachably engageable with an elbow pipe coupling 33 provided on the extremity of the upright portion of the conduit. Removable screw plugs 35 in the lower portion of the housing provide means for connection or removal of the suction conduit extension 34 as may be required. Thus in whatever position of relative adjustment the apparatus may be installed, the suction conduit will extend to the lowest point thereof and communicate with the oil supply. If, however, the apparatus is to be installed in an inverted position whereby the pump will be at the bottom of the housing and the oil drainage will surround the pump, there is provided in the pump mounting area 29 a hole 36 which, upon reversal of the pump about its longitudinal axis will register with the intake passage of the pump head 26 thus supplying oil directly to the pump independently of the suction conduit 27.

The pressure discharge conduit 28 comprises an endless loop or bight having both its ends opening through the pump mounting surface 29 at diagonally opposite points. Only one end of such distribution conduit however communicates with the pump. The direction in which the lubricant is circulated through the conduit 28 depends upon the direction in which the pump is operated. In either direction of pump operation one or the other end of the distributing conduit is closed by a check valve and the opposite end is in communication with the discharge outlet 23 of the pump. The pump operating against the resistance of such check valve builds up ample pressure within the conduit to effect jet discharge through suitably located vents throughout the length of the conduit in proximate relation with the bearings and surfaces to be lubricated. The distributing conduit 28 comprises continuing sections in the respective housing portions 4 and 5 which communicate with each other coincident with the division plane between the sections 4 and 5. The initial section 28a, the upper end of which opens through the pump mounting surface 29, extends downwardly and laterally along the rear wall or head of the housing section 4 and thence horizontally along the lateral peripheral wall thereof and has its end embedded in the lug or ear 31 just above the terminal of the suction conduit 27. The continuing portion 28b of the conduit has one end embedded in the internal integral lug or ear 32 of the housing portion 5. It extends thence across the end wall of the housing where it passes between the bearings 11 and 16 pertaining to the shafts 9 and 14. The conduit thence returns horizontally along the opposite peripheral wall of the housing section 5 with its terminal embedded in an ear or lug 37 interiorly of the housing and opposite the lugs or ears 32. When the housing sections are assembled this end of the conduit registers with the end of a third section 28c embedded in the ear or lug 38 interiorly of the housing section 4 and opposite the lug 31. The conduit portion 28c extends thence along the lateral wall of the housing and horizontally across the rear wall or head of the housing intermediate the bearings 3 and 10 of the motor shaft 2 and counter shaft 9 and after curving about the latter bearing 10 it opens through the pump mounting surface 29 diagonally opposite the open end of the initial section 28a. Intermediate the bearings 11 and 16 and again between the bearings 3 and 10 the conduit is provided with discharge vents 39 and 40 communicating with the respective bearings, through which oil is supplied to the several bearings under pressure. Furthermore the horizontal portions of the conduit are provided at spaced intervals with discharge orifices 41 from which jets of oil under pressure are discharged onto the several gear faces. Such jet openings may be variously located in such relation as to discharge upon such surfaces to be lubricated as may be desirable. The distribution conduit being normally closed by a spring controlled relief valve at one end or the other, depending upon the rotative position of the pump which discharges directly into the opposite end of the conduit, the only outlet for the oil is through the orifices 39, 40 and 41. Consequently there is afforded to the bearings and working surfaces a constant generous supply of lubricant under pressure. However, a spring actuated relief valve in the pump head permits a return of surplus lubricant from the distribution conduit direct to the housing preventing development of excess pressure. The pump 17 is provided at its opposite sides with clutch means engageable alternately with the end of the counter shaft 9. In the drawings this is shown merely as a cross pin 42 in the shaft of one of the impeller gears which is engageable in a slot in the end of the shaft 9. The head 26 of the pump is engageable in either of reverse positions upon the mounting surface 29. The opposite ends of the distributing conduit 28 open through diagonally opposite corners of the mounting area as shown in Fig. 5. The suction conduit 27 has its orifice in one of the remaining corners and diagonally opposite thereto is the hole 36 which communicates directly with the interior of the housing beside the pump. The head 26 is fixedly attached to the pump 17 and agrees with the mounting area 29 on which it is secured. This head 26 is provided with two curved passages extending from opposite corners of the rectangular head to the center thereof. One of these passages 43 communicates through an opening 44 at the inner end with the outlet 23 of the pump housing, and at its outer end is provided with an opening 45 which registers with one end of the distribution conduit 28. The oil discharged by the pump is thus delivered directly to the distribution conduit. The other curved passage 46 has an opening 47 at its outer end which registers with the open end of the suction conduit 27 on the mounting area 29, while the inner end of this passage is provided with two relatively spaced openings 48 at opposite sides of the port 44, which register with the intake ports 22 of the pump unit. These ports 48 are connected by a bight 46a of the passage 47 which partially surrounds the port 44, thus either suction side of the pump is connected with the suction conduit 27 and thence with the oil supply in the bottom of the housing. Diagonally opposite the opening 45 of the passage 43 is a valved port 49 controlled by a spring actuated valve 50 yieldingly held in closed position by a spring 51 in an extended passage 52 in the head. The passage 52 is closed at its outer end by a screw plug 53, but communicates with the interior of the housing through two holes 54 in the bottom of the passage which are positioned over the large opening 30 beside the suspended pump for return of excess oil to the housing. The fourth corner of the pump head 26 is without a port and serves to completely close either the hole 36 or the suction conduit 27 in diagonally opposite corners of the mounting area 29 according to the relative rotative position in which the pump and head are mounted. In one position of the pump relative to the head 26 the port 47 of the intake passage registers with the open end of the suction conduit 27 while the diagonally opposite opening 36 through which oil is drawn from the housing to the pump when the apparatus is inverted, is closed by the overlying imperforate corner portion of the head 26. At the same time the discharge port 45 registers with one end of the distribution conduit 28 and delivers oil under pressure thereto from the outlet 23 and through the registering port 44 and passage 43, while the valved relief port 49 registers with and yieldingly closes the opposite end of the oil distribution conduit. However, upon reversal of the pump and head position, the port 47 of the head is caused to register with the direct opening 36 into the housing while the end of the suction conduit 27 is closed by the overlying imperforate portion of the head. In such position of the head the supply port 45 and valved relief port 49 register in interchanged relation with the opposite ends of the oil distributing conduit 28.

In Figs. 8 to 11 inclusive there is shown an alternative construction of the pump unit wherein for convenient access the valves are located directly in the pump head outside the gear housing.

In this instance the pump is formed with an elongated neck through which the passages 22 are continued, and which terminate in spaced openings 22a in an integral top plate 55. The top plate 55 has in its respective corners holes 27′, 28′ and 36′ which agree with those in the mounting area 29. The top plate 55 in effect duplicates the mounting surface 29 to receive the head 26, between which head and the mounting surface 29 on the housing top the plate 55 is interposed. The head 26′ illustrated in Figs. 10 and 11 has therein a series of ports and valved passages 43′, 45′, 46′, 47′ and 49′ registering with the openings of the top plate 55 and corresponding to those of the primary construction illustrated in Fig. 7 and designated by the numerals 43, 45, 46, 47 and 49.

As shown in the sectional plan view of the modified pump head (Fig. 10), the intake passage 43′ has been transposed to the diagonally opposite corner of the head and the back pressure relief valve assembly is arranged transversely to that of Fig. 7.

The detachable head 26′ illustrated in Figs. 10 and 11 is provided in its under side with two parallel slots which, when the head is positioned in contact with the top plate 55 of the pump, provide respectively a discharge passage 43′ and an intake passage 46′. The discharge passage 43′ includes at its extremity an enlargement 45′ registering with either end of the high pressure distributing conduit 28, according to the relative position in which the head is affixed to the pump. The intake passage 46′ is provided with a similar enlargement 47′ registrable upon reversal of the head with either of the suction openings 27′ or 36′. The intake and outlet passages 43′ and 46′, as shown in Figs. 10 and 11 are interconnected by parallel transverse doubly valved passages 56 and 57 each having therein an opening 22b registering with the orifices 22a in the top plate 55. These passages 56 and 57 interconnecting the intake and discharge passages are counter-bored to provide valve seats for spring actuated inlet valves 58 and outlet valves 59.

The pump conduits 22 serve as interchangeably low and high pressure or suction and discharge conduits according to the direction in which the pump unit is driven by actuation of the shaft 9. Therefore the orifices 22a and corresponding orifices 22b communicate alternately with said suction and discharge conduits. Regardless of which of these ports may communicate with the high pressure side of the pump, the oil under pressure entering the corresponding passage 56 or 57, as the case may be, cannot escape through the valve 58, which will be more tightly seated by the fluid pressure. The oil under pressure therefore necessarily unseats the corresponding valve 59 against the tension of its spring and escapes into the discharge passage 43′ and thence through the enlarged orifice 45′ and opening 28′ into the high pressure distribution conduit 28. From the conduit 28 jets of oil are distributed to the various bearings and other surfaces to be lubricated. The back pressure of oil within the conduit is exerted through the opposite end of the conduit and port 49′ of the pump head against the relief valve 50. Upon the opening of the relief valve 50 against the tension of its spring 51 the excess oil is permitted to escape into the passage 52 and thence through the return port 54 to the gear housing.

The oil supply drawn from the housing through the suction of conduit 27 or through the opening 36′, dependent upon the relative position of the apparatus, enters through the enlarged port 45′ into the intake passage 43′. One of the inlet valves 58, being held seated by the discharge pressure supplemental to its actuating spring, resists the entrance of the oil supply therethrough, but the other inlet valve 58, being in communication with the suction side of the pump yields under suction influence to admit oil to the intake passage 22 of the pump. Screw plugs 60 in the side of the head 26 afford easy access to the intake and discharge valves 58 and 59, while a similar plug 53 permits access to the relief valve 50. The holes 61 in the top plate 55 register with the return port 54 in alternate positions of the head 26 to permit return of excess oil.

By the construction disclosed, the direction of flow of oil through the high pressure distributing conduit may be alternated by reversing the entire pump in relation to its drive shaft 9, in which event the direction of rotation of the impeller gears 18 and 19 is reversed. As an alternative, such reversal of direction of oil flow may be effected by reversing only the pump head, in which event the direction of oil flow is changed without changing the direction of rotation of the impeller gears. In either event, that is, by reversing the entire pump or only the head in relation with the pump body, the oil supply may be drawn either through the suction conduit 27 or through the opening 36, according to the position in which the apparatus is mounted.

The universal adaptability of the present system to different positions of installation or changes of operating position, whereby whatever the position of the mechanism housing may be, the spent lubricant drained to the lowest area of the housing may be withdrawn through one or the other of the suction passages 27 and 36, is diagrammatically illustrated in Figs. 13 to 18.

Figure 13:
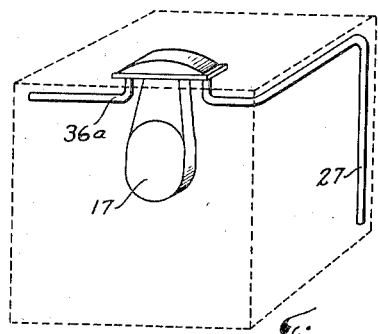
Figure 15:
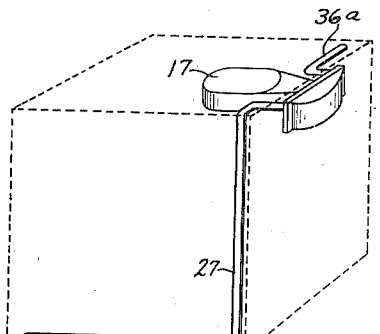
Figure 14:
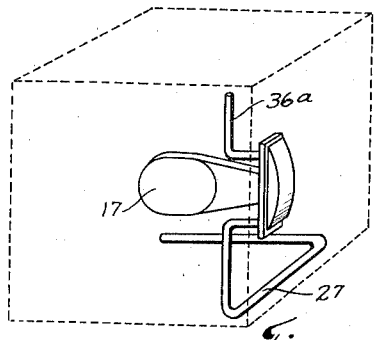

The intake orifices of the alternative suction passages are disposed in diagonal relation within the mechanism chamber. For illustrative purposes and to better illustrate successive positions of adjustment, the mechanism chamber is illustrated diagrammatically by dotted lines as cubical, showing by solid lines the pump unit 17 and respective suction or intake passages. In Fig. 13 the mechanism housing is shown upright with the pump unit suspended from its top and with the suction conduit 27 communicating with one of the lower corners while the conduit 36a connects the intake 36 with the diagonally opposite corner. Spent lubricant settling to the bottom of the housing will be withdrawn through the conduit 27. The same condition prevails if the apparatus is turned to the right as in Fig. 14 or rotated rearward as in Fig. 15. In each instance the suction or intake conduit 27 will communicate with the lower level of the housing to which the spent lubricant will drain.

Figure 16:
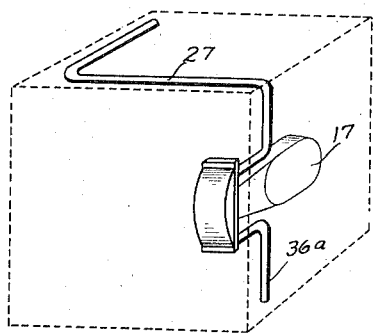
Figure 18:
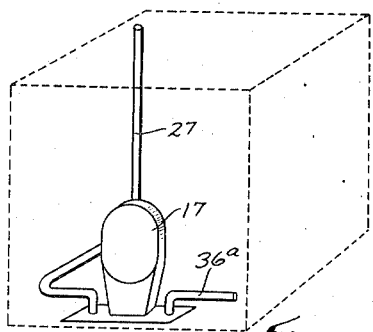
Figure 17:
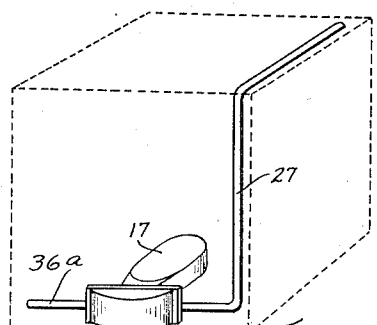

If, however, the apparatus is turned toward the left from its upright (Fig. 13) portion, as in Fig. 16, the conduit 27 will be elevated above the level of the spent lubricant accumulation, but by such bodily adjustment of the apparatus the intake 36a will be brought to the low level and by reversal of the pump head as before described, the supply of spent lubricant will be withdrawn through the suction intake 36. Upon turning the housing from its normal upright (Fig. 13) position forwardly as in Fig. 17, or upon complete inversion thereof as in Fig. 18, the same condition prevails and in each position the intake 36a communicates with the lowermost lubricant drain area or sump. Thus, by disposing the suction or intake passages in diagonally opposite relation within the housing, one or the other will be operative in every possible position of rotative adjustment. This enables a motor or other mechanism to be universally accommodated to different positions of installation and different conditions of operation while maintaining ample and sufficient lubricant distribution.

As shown in Fig. 12, a porous filter plug 62 may be inserted in one of the head passages, where it is held in position by a spring 63. The circulation of the lubricant through such filter plug 62 serves to remove therefrom grit and foreign matter sucked up from the mechanism housing.

Such filter plug may be inserted at any desired point in the circulation system and may be varied for different conditions of use.

A pressure gauge 65 is preferably, but not necessarily, connected with the distribution conduit, preferably by communication with the relief chamber 49.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a lubricating apparatus wherein lubricant under pressure is supplied to differently located operating parts enclosed within a housing, including a circuitous distribution conduit extending in proximate relation with the parts to be lubricated and having relatively spaced discharge outlets contiguous to the points of application of lubricant from which lubricant is discharged to said parts and thence into the housing, a pump having lubricant intake and discharge orifices, and including a main body portion and a head reversible to enable the connection of the pump discharge orifice with either end of the distribution conduit for circulation of lubricant therethrough in either direction, and lubricant suction passages communicating respectively with the intake orifice of the pump in alternate positions of the main body portion and head of the pump to return spent lubricant from the housing to the pump.

2. In a lubricating apparatus wherein lubricant under pressure is supplied to differently located operating parts enclosed within a housing, including a circuitous lubricant conduit extending in proximate relation with the parts to be lubricated and having relatively spaced discharge outlets contiguous to the points of application of the lubricant, and a pump connected therewith for discharging lubricant under pressure through the conduit and the discharge outlets onto the parts to be lubricated and thence into the housing wherein the discharged lubricant collects, the pump including a main body portion and a head relatively reversible to enable lubricant to be discharged alternately in opposite directions through the conduit, and a suction intake to said pump communicating with the housing exteriorly of the conduit through which discharged lubricant is returned for re-circulation.

3. In a lubricating apparatus wherein lubricant under pressure is distributed to differently located parts enclosed in a housing, including a circuitous distribution conduit having its opposite ends disposed in adjacent relation and forming an intermediate loop contiguous to the several distribution points and having relatively spaced discharge openings therein, a pump having a reversible head and an outlet engageable with either end of the distribution conduit to circulate lubricant in either direction therethrough in accordance with the position of the reversible head relative to the pump body, and separate suction passages communicating with different portions of the housing with which the intake of the pump is alternately connected in accordance with the direction in which lubricant is circulated through the conduit.

4. A lubricating apparatus wherein lubricant under pressure is supplied to a plurality of parts enclosed in a housing to the bottom of which spent lubricant is drained, including a circuitous distribution conduit common to the parts to be lubricated and having discharge orifices adjacent thereto, the ends of which conduit terminate in adjacently spaced relation, and a pump unit engageable with the housing and including sections bodily reversible to place the pump discharge orifice in communication with one or the other end of said conduit, a pressure operated relief valve discharging into the housing and selectively associated with the end of the conduit not in communication with the pump discharge orifice by reversal of the pump sections, and a suction connection to the pump communicating with the housing.

5. A lubricating apparatus wherein lubricant under pressure is supplied to a plurality of parts enclosed within a housing into which spent lubricant is drained, characterized by a two part housing, a circuitous sectional conduit common to the parts to be lubricated and having therein lubricant discharge orifices adjacent to said parts, a portion of the conduit being disposed in one part of the housing and the remainder of the conduit being disposed in the other part of the housing, the termini of the respective conduit portions registering with each other in the plane of separation of the two part housing, and a pump made up of bodily reversible sections having its discharge port in communication with one or the other end of the conduit in accordance with the relative positions of the pump sections and its intake port in communication with the housing, and so constructed and arranged as to circulate under pressure through the conduit portion in one part of the separable housing and thence through the conduit portion in the other portion thereof lubricant drawn from the housing.

6. The combination with a gear head motor of a gear housing enclosing gear transmission elements, a circuitous conduit common to a plurality of lubrication points within the housing and having relatively spaced lubricant discharge orifices adjacent the lubrication points from which spent lubricant is drained into the housing, a pressure pump actuated by the motor for withdrawing lubricant from the housing and discharging it under pressure through the conduit, the pressure pump being made up of bodily reversible sections controlling the direction of flow through the circuitous conduit by their relative adjusted positions, and a pressure relief valve associated with one or the other end of the conduit in accordance with the relative adjusted positions of the pump sections.

7. The combination with a gear head motor of a gear housing enclosing gear transmission elements, a circuitous conduit common to a plurality of lubrication points within the housing and having relatively spaced lubricant discharge orifices adjacent the lubrication points from which spent lubricant is drained into the housing, a bodily reversible pump actuated by the motor and so constructed and arranged as to draw lubricant from the housing and discharge it in either direction through the conduit in accordance with its bodily position, and a pressure relief valve effective at the discharge end of the conduit irrespective of the direction of lubricant flow therethrough.

8. The combination with a gear head motor of a gear housing enclosing gear transmission elements, a circuitous conduit common to a plurality of lubrication points within the housing and having relatively spaced lubricant discharge orifices adjacent the lubrication points from which spent lubricant is drained into the housing, a bodily reversible pressure pump operated by the motor and so constructed and arranged as to draw lubricant from the housing in either of reverse rotative positions thereof and discharge it through the conduit and a pressure relief valve effective at the discharge end of the conduit.

9. In a lubricating system for a gear head motor, the combination with an electric motor of a gear housing contiguous to the motor casing into which the motor shaft projects, a counter shaft and a driving shaft mounted in the gear housing, bearings for said shafts, and a train of gears connecting the motor shaft with the counter shaft and the latter with the driving shaft, a circuitous lubricant conduit delivering lubricant under pressure to the several shaft bearings, from which the lubricant drains to the bottom of the housing, a pump made up of relatively reversible sections located within the housing and driven by one of said shafts, a suction connection for said pump communicating with the lower portion of the housing into which the spent lubricant drains, and a discharge outlet from the pump connected with the discharge end of the lubricant distributing conduit.

10. In a lubricating system for a gear head motor, the combination with an electric motor of a gear housing contiguous to the motor casing into which the motor shaft projects, a power shaft projecting from the housing, a gear transmission enclosed within the housing and operatively connecting the motor shaft and power shaft in change speed ratio, a circuitous lubricant distribution conduit through which lubricant under pressure is distributed to a plurality of points of the gear transmission and thence into the housing, a bodily reversible pump having operative driving connection with the motor, drawing spent lubricant from the housing and discharging it under pressure through said conduit, and a pressure relief valve associated with said conduit.

11. A lubricating apparatus for a mechanism enclosed within a housing and having a plurality of parts to be lubricated, to which lubricant is discharged under pressure and the spent lubricant collected in the housing, including a circuitous conduit having its ends disposed in adjacent spaced relation and having discharge orifices in proximate relation to the parts to be lubricated, a sectional pump for withdrawing spent lubricant from the housing and delivering it under pressure through the conduit, the sections of said pump being bodily reversible, to place the discharge outlet thereof in communication with either end of the conduit, and a pressure relief valve associated with such reversible pump part placed in communication with either end of the conduit in alternation with the discharge outlet of the pump and adapted to relieve excess lubricant under pressure from the conduit to the housing.

12. A lubricating apparatus for a mechanism enclosed within a housing and having a plurality of parts to be lubricated to which lubricant is discharged under pressure and the spent lubricant collected in the housing, including a circuitous conduit having its ends disposed in adjacent spaced relation and having discharge orifices in proximate relation to the parts to be lubricated, a sectional pump for withdrawing spent lubricant from the housing and delivering it under pressure through the conduit, plural supply passages for lubricant communicating with different positions of the housing through which spent lubricant may be withdrawn from corresponding portions of the housing for discharge through the conduit, the sections of the pump being relatively reversible, to place the intake orifice of the pump in communication with either of said supply passages to the exclusion of the other while maintaining communication of the discharge orifice thereof with the distribution conduit.

13. In a lubricating system, a conduit through which lubricant is circulated under pressure, plural supply passages through either of which lubricant is supplied to the intake orifice of a pump and with either of which the intake orfice of the pump may be placed in communication to the exclusion of the other, and a sectional pump communicating simultaneously with said conduit and with a different one of the lubricant supply passages in each of a plurality of different relative positions of adjustment of the pump sections.

14. In a lubricating system, a conduit through which lubricant is circulated in either direction under pressure, a supply passage for lubricant connecting the intake of a pump with a source of lubricant supply, and a pump made up of bodily reversible sections communicating simultaneously with the source of lubricant supply and with a different end of the lubricant circulating conduit in each of a plurality of different relative positions of adjustment of the pump sections.

15. In an apparatus wherein parts requiring lubrication are disposed in a housing made up of separable sections and lubricant is conveyed to the parts under pressure from a source of lubricant supply common to the separable sections of the housing, lubricant conduit lengths from which lubricant is delivered to the parts affixed in the walls of the sections in such position that upon combining the housing sections the conduit lengths will be disposed with their open ends flush with the joining faces of the housing sections and in position to register with each other to provide continuous series conduits through the housing on joinder of the sections, and a reversible lubricant circulating means with which the series connected conduits communicate for circulating the lubricant therethrough in alternate directions.

ARTHUR F. BERGER.